(12) United States Patent
Kim et al.

(10) Patent No.: US 9,862,611 B1
(45) Date of Patent: Jan. 9, 2018

(54) METHOD FOR PRODUCING CARBON NANOTUBES

(71) Applicants: SK Innovation Co., Ltd., Seoul (KR); SK Global Chemical Co., Ltd., Seoul (KR)

(72) Inventors: Ji-Min Kim, Daejeon (KR); Min-Ji Sung, Daejeon (KR); Yong-Tak Kwon, Daejeon (KR); Sang-Uk Kim, Daejeon (KR); Ok-Youn Kim, Daejeon (KR); Sung-Real Son, Daejeon (KR); Jung-Yul Son, Daejeon (KR)

(73) Assignees: SK Innovation Co., Ltd., Seoul (KR); SK Global Chemical Co., Ltd., Seoul (KR)

( * ) Notice: Subject to any disclaimer, the term of this patent is extended or adjusted under 35 U.S.C. 154(b) by 0 days.

(21) Appl. No.: 15/666,742

(22) Filed: Aug. 2, 2017

(30) Foreign Application Priority Data

Aug. 4, 2016 (KR) .................... 10-2016-0099399

(51) Int. Cl.
| | | |
|---|---|---|
| *D01F 9/127* | (2006.01) | |
| *C01B 32/162* | (2017.01) | |
| *B01J 8/18* | (2006.01) | |
| *B01J 8/00* | (2006.01) | |
| *B82Y 40/00* | (2011.01) | |
| *B82Y 30/00* | (2011.01) | |

(52) U.S. Cl.
CPC .......... *C01B 32/162* (2017.08); *B01J 8/0015* (2013.01); *B01J 8/1827* (2013.01); *B01J 2208/00752* (2013.01); *B82Y 30/00* (2013.01); *B82Y 40/00* (2013.01); *Y10S 977/742* (2013.01); *Y10S 977/843* (2013.01)

(58) Field of Classification Search
CPC .............. C01B 32/162; C01B 2202/10; C01B 2202/20; C01B 2202/22; C01B 2202/24; C01B 2202/26; C01B 2202/28; C01B 2202/30; C01B 2202/32; C01B 2202/34; C01B 2202/36; B01J 8/0015; B01J 8/1827; B01J 2208/00752; B82Y 30/00; B82Y 40/00; B82Y 5/00; B82Y 10/00; B82Y 15/00; B82Y 20/00; B82Y 25/00; B82Y 99/00; Y10S 977/742; Y10S 977/843; D01F 9/10; D01F 9/127; D01F 9/1271; D01F 9/1272; D01F 9/1273; D01F 9/1274; D01F 9/1275; D01F 9/1276; D01F 9/1277; D01F 9/1278
USPC ................................ 977/742–754, 842–848
See application file for complete search history.

(56) References Cited

U.S. PATENT DOCUMENTS

| | | | |
|---|---|---|---|
| 6,413,487 B1* | 7/2002 | Resasco ................. | B01J 8/0055 423/447.3 |
| 2004/0000697 A1* | 1/2004 | Setoguchi ................. | B01J 8/18 257/432 |
| 2004/0151654 A1* | 8/2004 | Wei ........................ | B01J 8/0055 423/447.3 |
| 2005/0042162 A1* | 2/2005 | Resasco ................. | B01J 8/0055 423/447.3 |
| 2006/0057054 A1* | 3/2006 | Fujioka .................. | B82Y 30/00 423/447.2 |
| 2007/0154382 A1* | 7/2007 | Edwin ..................... | B01J 4/002 423/447.3 |
| 2012/0219490 A1* | 8/2012 | Noda ....................... | B01J 21/04 423/447.3 |

OTHER PUBLICATIONS

Dasgupta, et al., Fluidized bed synthesis of carbon nanotubes—A review, Chemical Engineering Journal 2011; 171: 841-869.*

* cited by examiner

*Primary Examiner* — Daniel C McCracken
(74) *Attorney, Agent, or Firm* — The Webb Law Firm

(57) ABSTRACT

Disclosed is a method for producing a carbon nanotube, including supplying a carbon nanotube and a catalyst to a reactor in a predetermined order or simultaneously and fluidizing them to form a fluidized bed, wherein a difference in minimum fluidization velocities ($\Delta V$) according to Formula 1 below is 5 cm/s or less: [Formula 1] Difference in minimum fluidization velocities ($\Delta V$, cm/s)=$|V_{cat}-V_{cntproduct}|$ wherein $V_{cat}$ is a minimum fluidization velocity of catalyst, and $V_{CNTproduct}$ is a minimum fluidization velocity of carbon nanotubes supplied to a reactor in the step of forming a fluidized bed.

8 Claims, 2 Drawing Sheets

METHOD FOR PRODUCING CARBON NANOTUBES

CROSS-REFERENCE TO RELATED APPLICATION

This application claims priority to Korean Patent Application No. 10-2016-0099399 filed Aug. 4, 2016, the disclosure of which is hereby incorporated in its entirety by reference.

BACKGROUND

1. Technical Field

The present disclosure relates to a method for producing carbon nanotubes.

2. Description of the Related Art

Recently, carbon nanotubes have been widely used in various fields such as electric or electronic fields, energy fields, and polymer composite materials fields.

Such carbon nanotubes can be synthesized by arc discharge, laser ablation, chemical vapor deposition, or the like. For example, the carbon nanotubes can be synthesized by a chemical vapor deposition using a so-called fluidization method.

In general, the synthesis of carbon nanotubes using a fluidization method refers to a method in which a catalyst is fluidized with a carrier gas and a hydrocarbon gas to cause them to react with each other.

In this way, the carbon components of the hydrocarbons are dissolved in the catalyst and then precipitated on a surface of the catalyst to grow into carbon nanotubes. At this time, the carbon nanotubes may not be formed or a coke, that is, a carbonaceous material remaining after volatilization of an organic material without air, may be formed on the surface of the catalyst due to pyrolysis of hydrocarbons, which causes a decrease in the activity of the catalyst.

SUMMARY

In one embodiment of the present disclosure, there is provided a method for producing a carbon nanotube which can control an average length in a wider range, while achieving excellent yield, excellent economy, and excellent workability.

However, the technical problem to be solved by the present disclosure is not limited to the above-mentioned problems, and other problems not mentioned above can be clearly understood by those skilled in the art from the following description.

In one embodiment of the present disclosure, there is provided a process for producing a carbon nanotube, comprising supplying a carbon nanotube and a catalyst to a reactor in a predetermined order or simultaneously and fluidizing them to form a fluidized bed, wherein a difference in minimum fluidization velocities ($\Delta V$) according to Equation 1 below is 5 cm/s or less.

In the above production method, apart from the carbon nanotubes obtained by growing on the catalyst as a result of the catalytic reaction of carbon sources, the carbon nanotubes are supplied to the reactor, before initiating the reaction of the carbon sources, to fluidize the carbon nanotubes, so that even when heat is generated due to the reaction of the catalyst with a source gas of the carbon sources to be supplied later, the carbon nanotubes that form a fluidized bed while flowing in the reactor can effectively disperse the heat.

Accordingly, it is possible to prevent a phenomenon of the occurrence of coke on a surface of the catalyst and to maintain its activity for a longer time, and thus an excellent yield, excellent economy and workability can be achieved.

Further, the reaction time of the source gas and the catalyst can be controlled within a wider range, and accordingly an average length of the carbon nanotubes produced by the above-described method can also be controlled within a wider range.

In the step of forming the fluidized bed, the carbon nanotubes supplied to the reactor may disperse heat while flowing in the reactor.

Specifically, the carbon nanotubes supplied to the reactor are not directly involved in the reaction of the catalyst with the source gas to be subsequently supplied, and the carbon nanotubes may perform a role of dispersing heat generated by the reaction while flowing in the reactor before the reaction of the carbon source and the catalyst is initiated.

In the above production method, the difference in the minimum fluidization velocities ($\Delta V$) according to the following formula 1 may be, for example, about 5 cm/s or less, specifically 0 to about 3 cm/s:

$$\text{Difference in minimum fluidization velocities } (\Delta V, \text{cm/s}) = |V_{cat} - V_{CNT\,product}| \quad \text{[Formula 1]}$$

wherein $V_{cat}$ is a minimum fluidization velocity of catalyst, and $V_{CNT\,product}$ is a minimum fluidization velocity of carbon nanotubes supplied to a reactor in the step of forming a fluidized bed.

As such, the heat generated from the catalyst itself or therearound can be effectively dispersed, so that the activity of the catalyst can be maintained for a longer time.

The minimum fluidization velocity of the catalyst may be, for example, from about 0.1 cm/s to about 10 cm/s, and specifically from about 0.2 cm/s to about 2.0 cm/s.

With the minimum fluidization velocity in the above range, the catalyst can be more uniformly mixed with both the carbon nanotubes supplied to the reactor and the carbon nanotubes obtained by the above-described method, thereby effectively dispersing the heat generated around the catalyst due to the reaction with the source gas.

In the step of growing the carbon nanotubes, the temperature difference ($\Delta T$) according to the following formula 2 may be, for example, about 20° C. or less, specifically about 0° C. to about 15° C.:

$$\text{Temperature difference } (\Delta T, \text{°C.}) = T_1 - T_2 \quad \text{[Formula 2]}$$

wherein $T_1$ and $T_2$ indicate a temperature of the fluidized bed as measured at two different heights, each being selected arbitrarily from a height ranging from the bottom to the top of the fluidized bed.

Accordingly, the accumulation of heat can be prevented, thereby effectively reducing the occurrence of coke on the surface of the catalyst.

In the step of growing the carbon nanotubes, it may not be necessary to separately classify and remove the carbon nanotubes supplied to the reactor in the process of forming the fluidized bed after obtaining the grown carbon nanotubes.

Accordingly, the production process is simplified, and excellent efficiency and excellent economy can be achieved.

The production method of carbon nanotubes can control an average length in a wider range, while achieving excellent yield, excellent economy and workability.

DETAILED DESCRIPTION

Figure 1:
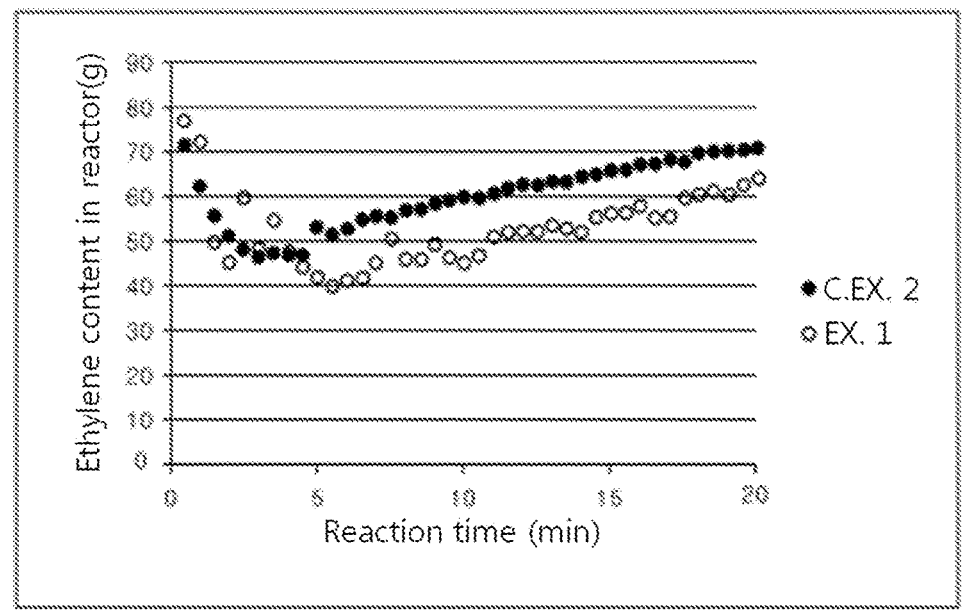
FIG. 1 is a graph showing the degree of activity of each catalyst versus a reaction time in a method for producing carbon nanotubes according to Example 1 and Comparative Example 2 of the present disclosure.

As used herein, when it is assumed that certain embodiments and/or certain components included therein "comprises" certain elements, unless specifically stated otherwise, it is understood that one or more other components may be included, rather than excluding other components.

As used herein, the terms "lower" and "upper" are used for descriptive purposes only and it will be understood by those skilled in the art that different orientations are possible.

As used herein, the term "step of" does not mean "step for."

As used herein, the term "about" or "substantially" is intended to have meanings close to numerical values or ranges specified with an allowable error and intended to prevent accurate or absolute numerical values disclosed for understanding of the present disclosure from being illegally or unfairly used by any unconscionable third party.

Hereinafter, embodiments of the present disclosure will be described in detail with reference to the accompanying drawings. It should be understood that the present disclosure is not limited to the following embodiments, and that the embodiments are provided for illustrative purposes only. The scope of the invention should be defined only by the accompanying claims and equivalents thereof.

In one embodiment of the present disclosure, a method for producing carbon nanotubes is provided. The method includes supplying a carbon nanotube and a catalyst to a reactor in a predetermined order or simultaneously and fluidizing them to form a fluidized bed, wherein a difference in minimum fluidization velocities ($\Delta V$) according to formula 1 is 5 cm/s or less.

Conventionally, in a fluidizing method for producing carbon nanotubes, only a predetermined gas and catalyst including a carrier gas or the like was used as a material for forming an initial fluidized bed or fluidized phase in a reaction space, and carbon nanotubes were produced by reacting a carbon source with a catalyst in such a fluidized bed or fluidized phase, where, as the reaction proceeds, heat was not dispersed around the catalyst, but accumulated therearound, during which time coke was formed on the surface of the catalyst, and thereby the catalyst activity was easily deteriorated.

Unlike the conventional fluidization method described above, the production method according to an embodiment of the present disclosure is characterized in that carbon nanotubes are supplied to a reactor in a reaction space together with a catalyst in a predetermined order or simultaneously, and fluidized them to form a fluidized bed. That is, in the above production method, apart from the carbon nanotubes obtained by growing on the catalyst as a result of the catalytic reaction of carbon sources, the carbon nanotubes are supplied to a reactor, before initiating the reaction of the carbon sources, to fluidize the carbon nanotubes.

As a result, in the above production method, even though heat is generated due to the reaction of the catalyst with the source gas for supplying carbons, the carbon nanotubes forming a fluidized bed while flowing in the reactor can effectively disperse the heat before the reaction is initiated, and therefore it is possible to prevent a phenomenon of the occurrence of coke on the surface of the catalyst and to maintain its activity for a longer time, and thus an excellent yield, excellent economy and workability can be achieved.

Further, the reaction time of the source gas and the catalyst can be controlled within a wider range, and accordingly the average length of the carbon nanotubes produced by the above-described method can also be controlled within a wider range. For example, carbon nanotubes having a short average length and carbon nanotubes having a longer average length can easily be produced, and thus the carbon nanotubes can be applied to various applications.

In the production method above, carbon nanotubes and catalysts may be supplied to a reactor in a predetermined order or simultaneously and fluidized to form a fluidized bed. The order of supplying the carbon nanotubes and the catalysts to the reactor is not particularly limited, and either one of them may be supplied first or simultaneously.

The reactor may be a reaction space provided in a facility or an apparatus for producing carbon nanotubes, and any kinds of reactor known in the art may be used, and are not particularly limited.

The reactor may be a part of a production facility or an apparatus for carbon nanotubes, and the reactor may be, for example, a reactor comprising an outer space and an enclosed inner space. The production facility or apparatus may further include a catalyst supply unit; a source gas supply unit; a carrier gas supply unit; a gas outlet; and a carbon nanotube recovery unit.

In the step of forming the fluidized bed, the carbon nanotubes supplied to the reactor may disperse heat while flowing in the reactor.

Specifically, the carbon nanotubes supplied to the reactor are not directly involved in the reaction of the catalyst with the source gas to be subsequently supplied, and the carbon nanotubes may perform a role of dispersing heat generated by the reaction while flowing in the reactor before the reaction of the carbon source and the catalyst is initiated. Accordingly, it is possible to prevent a phenomenon of the occurrence of coke on the surface of the catalyst and to maintain its activity for a longer time.

The carbon nanotubes to be fed to the reactor may have, for example, an average diameter in the cross-section of from about 13 nm to about 16 nm and an average length of from about 3.0 μm to about 5.5 μm, but are not limited thereto, and any kinds of carbon nanotubes known in the art can suitably be used.

The catalyst may be prepared, for example, by a solution impregnation method, a spray drying method, or the like, and may be a porous catalyst having a metal catalyst supported on an oxide support such as $Al_2O_3$ and $SiO_2$. The catalyst may include, but is not limited to, at least one selected from the group consisting of Mg, Fe, Mo, Co, Yr, Ni, and combinations thereof.

In the above production method, the difference in the minimum fluidization velocities ($\Delta V$) according to the following formula 1 may be, for example, about 5 cm/s or less, specifically 0 to about 3 cm/s:

$$\text{Difference in minimum fluidization velocities } (\Delta V, \text{ cm/s}) = |V_{cat} - V_{CNT\,product}| \quad \text{[Formula 1]}$$

wherein $V_{cat}$ is a minimum fluidization velocity of catalyst, and $V_{CNT\,product}$ is a minimum fluidization velocity of carbon nanotubes supplied to a reactor in the step of forming a fluidized bed. Specifically, the $V_{CNT\,product}$ is a minimum fluidization velocity of the carbon nanotubes supplied to the reactor, independently of the carbon nanotubes growing on the catalyst, before the reaction between the source gas and the catalyst is initiated.

As used herein, the minimum fluidization velocity may refer to a flow rate at which the catalyst or the carbon nanotube starts to fluidize when a flow rate in the reactor is increased. The minimum fluidization velocity may be obtained, for example, by measuring the velocity at which the pressure drop of the fluidized bed becomes constant while increasing the fluidization velocity of the catalyst or carbon nanotube.

With the difference in the minimum fluidization velocities in the narrow range, the catalyst can be more uniformly mixed with the carbon nanotubes supplied to the reactor. As such, the heat generated from the catalyst itself or therearound can effectively be dispersed, so that the activity of the catalyst can be maintained for a longer time.

The minimum fluidization velocity of the catalyst may be, for example, from about 0.1 cm/s to about 10 cm/s, and specifically from about 0.2 cm/s to about 2.0 cm/s.

With the minimum fluidization velocity in the above range, the catalyst can be more uniformly mixed with both the carbon nanotubes supplied to the reactor and the carbon nanotubes obtained by the above-described method, thereby effectively dispersing the heat generated around the catalyst due to the reaction with the source gas.

Specifically, when the minimum fluidization velocity of the catalyst is out of the above range, the catalyst cannot be uniformly mixed with the carbon nanotubes described above, and the catalysts may be gathered together, so that the heat generated from the surroundings cannot be dispersed but accumulated, thereby resulting in the formation of coke on the catalyst and deteriorating its activity easily.

The particle density of the catalyst may be from about 1,300 kg/cm$^3$ to about 2,200 kg/cm$^3$. The particle density may be, for example, measured by filling a mess cylinder with the catalyst in a predetermined volume, measuring the weight of the filled catalyst, filling a cavity in the mess cylinder with a liquid having a known density, for example, distilled water having a density of 1 g/cm$^3$, measuring a volume of the filled liquid, and then calculating the particle density of the catalyst by a general physics law from the measured values.

With the particle density in the above range, the catalyst can properly be mixed with other components in the fluidized bed by appropriately adjusting the minimum fluidization velocity of the catalyst together with a particle diameter to be described later, whereby the heat generated in the catalyst can be more effectively dispersed.

The catalyst may be, for example, spherical and its particle diameter may be from about 10 μm to about 300 μm. The diameter may be measured using, for example, a particle size analyzer (Horiba).

With the particle diameter in the above range, the catalyst can properly be mixed with other components in the fluidized bed by appropriately adjusting the minimum fluidization velocity of the catalyst together with the particle density described above, whereby the heat generated in the catalyst can be more effectively dispersed.

In the step of forming the fluidized bed, the carrier gas, the source gas, or both may be supplied to fluidize the carbon nanotubes and the catalyst.

For example, the carrier gas and the source gas may be supplied in a predetermined order or may be supplied at the same time. In the case of supplying in a predetermined order, the order of supply is not particularly limited, and particularly, they can be supplied simultaneously.

Further, for example, the carrier gas and the source gas may be supplied earlier than the carbon nanotubes and the catalyst, or may be supplied later. Specifically, the carrier gas and the source gas may be supplied before the carbon nanotubes and the catalyst.

The carrier gas may include at least one selected from the group consisting of hydrogen, nitrogen, argon, helium, neon, xenon, and combinations thereof.

The fluidized bed may be formed to have a height of, for example, about 10 cm to about 150 cm, but is not limited thereto, and may suitably be changed according to the purpose and use of the disclosure.

The fluidized bed may be circular, for example, in terms of its macroscopic cross-section, and the cross-section may be formed to have a diameter of, for example, from about 10 cm to about 100 cm, but is not limited thereto. The shape and/or the diameter thereof may be appropriately changed according to the purpose and use of the disclosure.

In the step of forming the fluidized bed, they may be supplied to the reactor such that the weight ratio of the carbon nanotubes to the catalyst contained in the fluidized bed is about 1:0.5 to about 1:1.

The carbon nanotubes and the catalyst are supplied to the reactor so that the weight ratio is within the range, thereby achieving excellent production efficiency and excellent economy.

When the carbon nanotubes are supplied in too small a quantity out of the above range, the degree of dispersion of the heat in the fluidized bed is too low, and when the catalyst is supplied too small a quantity, the yield is too low to be economical.

In the step of forming the fluidized bed in the above production method, in the case where the carbon nanotubes and the catalyst are filled in the reactor to form a packed bed, the packed bed may be formed to have a ratio of the height to the diameter (L/D) of, for example, 1 or more, and specifically about 1 to about 1.5.

At this time, the packed bed may be a layer formed by packing the carbon nanotubes and the catalyst in the reactor before the carrier gas or the source gas is supplied.

The ratio of the height to the diameter of the packed bed should be in the above range so that the fluidized bed formed in the reactor is sufficient and thereby the heat can be more easily dispersed.

Specifically, when the ratio of the height to the diameter is less than about 1, the degree of heat dispersion is too small, and when it is more than about 1.5, although the degree of heat dispersion is so small, the cost of manufacturing an equipment or apparatus may be greatly increased, which is uneconomical.

The production method may further include growing carbon nanotubes on the catalyst by reacting the source gas and the catalyst.

The source gas may include, for example, a hydrocarbon as a carbon source. The hydrocarbon may be, for example, a hydrocarbon compound having 10 or less carbon atoms or 6 or less carbon atoms. Specific examples thereof may include, but are not limited to, at least one selected from the group consisting of methane, ethane, ethylene, ethanol, acetylene, propane, propylene, butane, butadiene, pentane, pentene, cyclopentadiene, hexane, cyclohexane, benzene, toluene, and combinations thereof.

The carbon nanotubes may be grown by adsorbing and decomposing the source gas to a catalyst comprising a metal, dissolving and diffusing the resulting decomposed carbon atoms into the catalyst, and then precipitating them on the catalyst, but not limited thereto.

Also, in the step of growing the carbon nanotubes, the growth time of the carbon nanotubes to be grown may be controlled by adjusting a reaction time between the source gas and the catalyst, and the reaction time may be about 5 minutes to about 1 hour.

The average length of the carbon nanotubes obtained by controlling the growth time of the carbon nanotubes may be at least 3.0 μm or more.

As described above, in the production method, the activity of the catalyst can be maintained for a longer time, and accordingly the reaction time of the source gas and the catalyst can be controlled without any additional process, so that the average length of the carbon nanotubes can be adjusted in a wider range through a single process as a whole.

According to the above-described production method, carbon nanotubes having a longer average length as well as carbon nanotubes having a shorter average length, for example, a carbon nanotube having an average length of at least 3.0 μm or more, and specifically an average length of about 3.0 μm to about 5.5 μm can be efficiently and economically produced with higher yield.

In the step of growing the carbon nanotubes, the temperature difference ($\Delta T$) according to the following formula 2 may be, for example, about 20° C. or less, and specifically about 0° C. to about 15° C.:

$$\text{Temperature difference } (\Delta T, \,^\circ C.) = T_1 - T_2 \quad \text{[Formula 2]}$$

wherein $T_1$ and $T_2$ indicate a temperature of the fluidized bed as measured at two different heights, each being selected arbitrarily from a height ranging from the bottom to the top of the fluidized bed. Specifically, $T_1$ is a temperature of the fluidized bed measured at a predetermined height selected from a height ranging from the bottom to the top of the fluidized bed, and $T_2$ is a temperature of the fluidized bed measured at a height different from a predetermined height at which the $T_1$ is measured, selected from the height range.

Also, for example, the difference between the measured $T_1$ and the measured $T_2$ may be from about 10 cm to about 800 cm, but is not limited thereto.

As described above, apart from the carbon nanotubes obtained by growing on the catalyst, the carbon nanotubes may be supplied to the reactor before or simultaneously with the exothermic reaction with the catalyst and the source gas to fluidize to cause the heat generated by the exothermic reaction to be effectively dispersed, whereby the activity of the catalyst can be effectively enhanced.

As a result, the temperature difference according to formula 2 above, that is, two different points arbitrarily selected from the height range from the bottom to the top of the fluidized bed, i.e., the temperature difference of the fluidized bed measured at different heights, can be implemented at a narrow level within the range, thereby preventing accumulation of heat and eventually reducing the occurrence of coke on the surface of the catalyst effectively.

In the step of growing the carbon nanotubes, the pressure in the fluidized bed may be about 1 bar to about 3 bars, but is not limited thereto.

Further, in the step of growing the carbon nanotubes, the average temperature in the fluidized bed may be set to a temperature at which the reaction between the source gas and the catalyst proceeds, and the temperature may be suitably selected according to the purpose and use of the disclosure within the range known in the art, but is not particularly limited.

The production method may further include recovering the carbon nanotubes grown on the catalyst.

The step of recovering the carbon nanotubes may be performed according to conditions and methods known in the art, but is not particularly limited.

In the step of growing the carbon nanotubes, it may not be necessary to separately classify and remove the carbon nanotubes supplied to the reactor in the process of forming the fluidized bed after obtaining the grown carbon nanotubes.

In the step of forming the fluidized bed, when supplying a heat-radiating material other than the carbon nanotubes, such as, graphite, to the reactor, the carbon nanotubes obtained after the growth is completed and an additional process of classifying and removing the carbon nanotubes are required, which complicates the production process, and renders the process inefficient and non-economical.

In the above production method, since it is not necessary to classify the carbon nanotubes obtained by the completion of the growth and the carbon nanotubes supplied to the reactor, the method can be simplified, and excellent efficiency and economy can be achieved.

Hereinafter, specific embodiments of the present disclosure will be described. However, the embodiments described below are only intended to illustrate or explain the present disclosure, and the present disclosure is not limited thereto.

EXAMPLES

Example 1

To a reactor provided in an apparatus for producing carbon nanotubes, hydrogen and nitrogen as a carrier gas were supplied together with ethylene as a source gas for supplying carbon, and carbon nanotubes and a catalyst having a particle density of 1300 kg/m$^3$, a particle diameter of 130 μm and a minimum fluidization velocity of 1.1 cm/s as a catalyst having Co and Fe supported on an $Al_2O_3$ support (available from SK Corporation) were supplied and fluidized in the reactor to form a fluidized bed. In this case, the aspect ratio of the packed bed filled with the carbon nanotube and the catalyst before supplying the carrier gas and the source gas was 1, and the weight ratio of the carbon nanotube to the catalyst contained in the fluidized bed was 1:0.6.

Subsequently, in the fluidized bed in the reactor, the ethylene was reacted with the catalyst for 30 minutes to grow carbon nanotubes on the catalyst, and the pressure of the fluidized bed during the growth of the carbon nanotubes was from 1 bar to 3 bars. Then, the grown carbon nanotubes were separated and recovered through a standpipe installed in a dispersion plate of the reactor. The average length of the carbon nanotubes thus recovered was 3.4 μm, and the average diameter of the cross-section was 15 nm.

Comparative Example 1 (when Carbon Nanotubes were not Separately Supplied to the Reactor)

Carbon nanotubes were finally recovered by the same conditions and methods as in Example 1, except that, in the step of forming a fluidized bed, when growing the carbon nanotubes without supplying the carbon nanotubes, the ethylene was reacted with the catalyst for 20 minutes in a fluidized bed reactor to grow carbon nanotubes on the catalyst. The average length of the carbon nanotubes thus recovered was 2.5 μm, and the average diameter of the cross-section thereof was 15 nm.

Specifically, after the catalyst was reacted with ethylene for 20 minutes, a large amount of coke was formed on the catalyst and the catalyst was deactivated. After that, the reaction could not be continued any more.

Comparative Example 2 (when the Difference in Minimum Fluidization Velocities is Large)

Carbon nanotubes were finally recovered by the same conditions and methods as in Example 1, except that, in the step of forming a fluidized bed, a catalyst having Co and Fe supported on an $Al_2O_3$ carrier and having a particle density of 1300 kg/m³, a particle diameter of 375 μm and a minimum fluidization velocity of 9.5 cm/s was supplied. The average length of the carbon nanotubes thus recovered was 2.7 μm, and the average diameter of the cross-section thereof was 15 nm.

Comparative Example 3 (when a Ratio of the Height to the Diameter of the Packed Bed is Small)

Carbon nanotubes were finally recovered by the same conditions and methods as in Example 1, except that the packed bed was formed to have an aspect ratio of 0.7. The average length of the carbon nanotubes thus recovered was 2.8 μm, and the average diameter of the cross-section thereof was 15 nm.

Experimental Example

Various physical properties of each of the carbon nanotubes according to Example 1 and Comparative Examples 1 to 3 were evaluated and described in Table 1 below.
Evaluation Experimental Example 1: Average Diameter and Length of Carbon Nanotubes Measurement: 30 carbon nanotubes according to Example 1 and Comparative Examples 1 to 3 were dispersed in a 2 wt % solution of SDS (sodium dodecyl sulfate) using an ultrasonic homogenizer, and then diameters were measured using TEM (Transmission Electron Microscopy), and the average value of these diameters was calculated to obtain an average diameter.
The lengths of the 30 carbon nanotubes were also measured using an SEM (Scanning Electron Microscope), and their average values were calculated to obtain an average length.

Experimental Example 2: Minimum Fluidization Velocities and the Difference Between them Measurement: for each of the catalysts used in Example 1 and Comparative Examples 1 and 2, a fluidized-bed pressure drop with increasing fluidization velocity was measured in a fluidized cold model made of transparent acrylate having a diameter of 15 cm, and the fluidization velocity at the time when the pressure drops became constant was measured and evaluated as the minimum fluidization velocity.
Subsequently, the difference in the minimum fluidization velocities was calculated by the following formula 1:

Difference in minimum fluidization velocities ($\Delta V$, cm/s)=$|V_{cat}-V_{CNT\,product}|$     [Formula 1]

wherein $V_{cat}$ is a minimum fluidization velocity of catalyst, and $V_{CNT\,product}$ is a minimum fluidization velocity of carbon nanotubes supplied to a reactor in the step of forming a fluidized bed.

Experimental Example 3: Synthesis Yield of Carbon Nanotubes

Measurement: In the above Example 1 and Comparative Examples 1 to 3, the weight of the catalyst supplied to the reactor was measured using a balance, and the weight of each of the carbon nanotubes recovered after the completion of growth was measured. Then, the synthesis yield was calculated using the following formula 3.

(Synthesis yield, %)={(weight of recovered carbon nanotubes)−(weight of catalyst)}/(weight of carbons in hydrocarbons supplied)×100     [Formula 3]

Experimental Example 4: Purity of Carbon Nanotubes

Measurement: the residual amount was measured using a TGA (Thermogravimetric Analysis, TA 500) at a temperature of 10° C./min and elevated from room temperature to 900° C. under an air condition to calculate the purity of each of the carbon nanotubes according to Example 1 and Comparative Examples 1 to 3 using the formula known in the art.

TABLE 1

| | Carbon nanotubes | | Difference in minimum fluidization velocities (cm/s) | Synthesis yield (%) | Purity (%) |
|---|---|---|---|---|---|
| | average diameter (nm) | average length (μm) | | | |
| EX. 1 | 15 | 3.4 | 0.1 | 35.9 | 81.4 |
| C. EX. 1 | 15 | 2.5 | 0.1 | 28.8 | 78.8 |
| C. EX. 2 | 15 | 2.7 | 8.3 | 32.0 | 79.4 |
| C. EX. 3 | 15 | 2.8 | 0.1 | 33.1 | 80.7 |

As shown in Table 1 above, it was clearly confirmed that the carbon nanotubes according to Example 1 had an average length of 3.0 μm or more, a synthesis yield of 35.0% or more, and a purity of 80.0% or more.
Meanwhile, it was confirmed that the carbon nanotubes according to Comparative Examples 1 to 3 had a shorter average length and a lower synthesis yield and purity, and, in particular, in the case of the carbon nanotubes according to Comparative Example 1, it was confirmed that the average length, the synthesis yield and the purity of the obtained grown carbon nanotubes were inferior due to the shortest time for maintaining the activity of the catalyst.
FIG. 1 is a graph showing the degree of activity of each catalyst versus the reaction time in the method for producing carbon nanotubes according to Example 1 and Comparative Example 2 of the present disclosure. It can be seen that the more smoothly the reaction between the source gas ethylene and the catalyst proceeds, the lower the ethylene content in the reactor, and the lower the ethylene content, the longer the activity of the catalyst is maintained.
As shown in FIG. 1, as the reaction time of Example 1 was longer than that of Comparative Example 2, the ethylene content in the reactor was lower, so that the activity of the catalyst was not deteriorated, but maintained for a longer time.
Further, FIG. 2 is a graph showing a temperature according to a height of fluidized bed in a method for producing carbon nanotubes according to Example 1 and Comparative Example 3 of the present disclosure.

Figure 2:
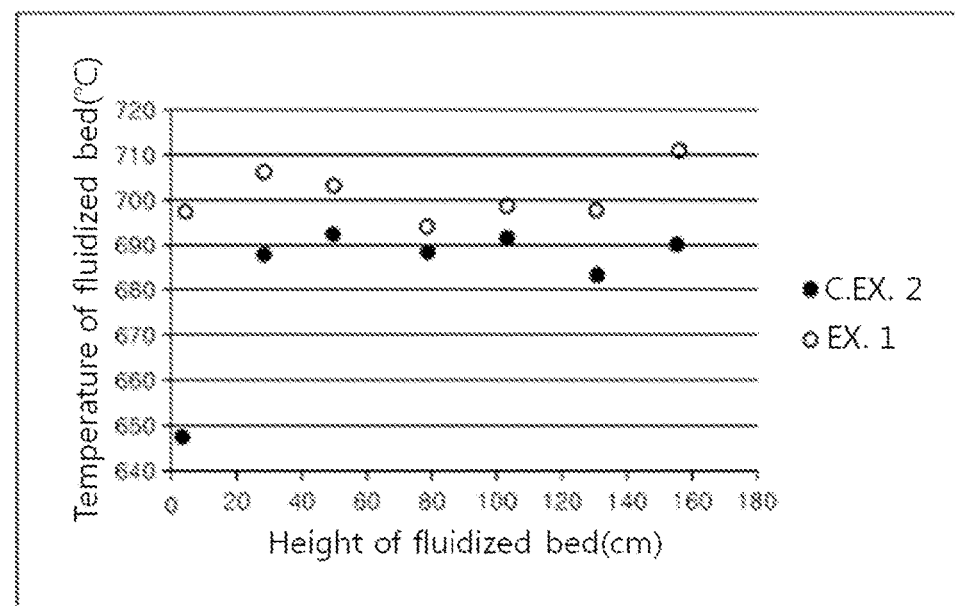
FIG. 2 is a graph showing a temperature versus a height of fluidized bed in a method for producing carbon nanotubes according to Example 1 and Comparative Example 3 of the present disclosure.

As shown in FIG. 2, the temperature difference of Example 1 according to the height of the fluidized bed is not larger than that of Comparative Example 2, and thus the heat generated by the reaction of the source gas and the catalyst is more effectively dispersed.

Figure 3:
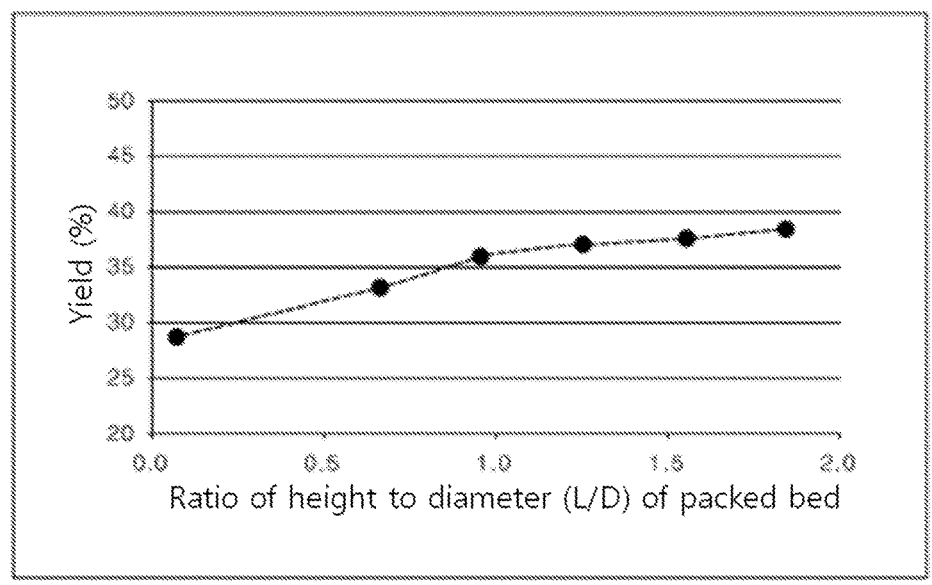
FIG. 3 is a graph showing a yield versus a ratio of height to diameter of a packed bed in a method of producing carbon nanotubes according to an embodiment of the present disclosure.

Further, FIG. 3 is a graph showing a yield according to a ratio of the height to the diameter of the packed bed in a method of producing carbon nanotubes according to an embodiment of the present disclosure. The yield increases as the ratio of the height to the diameter of the packed bed increases, but it is found that the increase is not significant when the ratio exceeds about 1.5.

Similarly, in Table 1, it can be confirmed that the yield of Example 1 in which the packed bed has an aspect ratio of 1 is superior to Comparative Example 3 in which the aspect ratio is 0.7.

What is claimed is:

1. A method for producing carbon nanotubes, comprising: supplying carbon nanotubes and catalysts to a reactor in a predetermined order or simultaneously and fluidizing them to form a fluidized bed,
wherein a difference in minimum fluidization velocities ($\Delta V$) according to the following formula 1 is not more than 5 cm/s:

Difference in minimum fluidization velocities ($\Delta V$, cm/s)=$|V_{cat} - V_{CNT\,product}|$      [Formula 1]

wherein $V_{cat}$ is a minimum fluidization velocity of catalyst, and $V_{CNT\,product}$ is a minimum fluidization velocity of carbon nanotubes supplied to a reactor in the step of forming a fluidized bed.

2. The method of claim 1, wherein the minimum fluidization velocity of the catalyst is 0.1 cm/s to 10 cm/s.

3. The method of claim 1, wherein the catalyst has a particle density of 1,300 kg/cm$^3$ to 2,200 kg/cm$^3$.

4. The method of claim 1, wherein the catalyst has a diameter of 10 μm to 300 μm.

5. The method of claim 1, wherein, in the step of forming the fluidized bed, when the carbon nanotubes and the catalyst are filled in the reactor to form a packed bed, the packed bed is formed to have a ratio of height to diameter (L/D) of 1 or more.

6. The method of claim 1, wherein, in the step of forming the fluidized bed, the carbon nanotubes and the catalyst are supplied to the reactor so that a weight ratio of the carbon nanotubes to the catalyst contained in the fluidized bed is 1:0.5 to 1:1.

7. The method of claim 1, further comprising growing carbon nanotubes on the catalyst by reacting a source gas and the catalyst.

8. The method of claim 7, wherein, in the step of growing the carbon nanotubes, the temperature difference ($\Delta T$) according to the following formula 2 is 20° C. or less:

Temperature difference ($\Delta T$, ° C.)=$T_1 - T_2$      [Formula 2]

wherein $T_1$ and $T_2$ indicate a temperature of the fluidized bed as measured at two different heights, each being selected arbitrarily from a height ranging from the bottom to the top of the fluidized bed.

* * * * *